(12) United States Patent
Domenicucci et al.

(10) Patent No.: US 9,730,456 B2
(45) Date of Patent: Aug. 15, 2017

(54) OVEN CHAIN MEASUREMENT SYSTEM (71) Applicants: Philip J. Domenicucci, Rockaway, NJ (US); Jean-Sébastien Labrie, Sherbrooke (CA); Alain Lemieux, Sherbrooke (CA)

(72) Inventors: Philip J. Domenicucci, Rockaway, NJ (US); Jean-Sébastien Labrie, Sherbrooke (CA); Alain Lemieux, Sherbrooke (CA)

(73) Assignee: AMF Automation Technologies, LLC, Richmond, VA (US)

( * ) Notice: Subject to any disclaimer, the term of this patent is extended or adjusted under 35 U.S.C. 154(b) by 0 days.

(21) Appl. No.: 14/980,557

(22) Filed: Dec. 28, 2015

(65) Prior Publication Data

US 2017/0006878 A1  Jan. 12, 2017

Related U.S. Application Data

(62) Division of application No. 14/072,026, filed on Nov. 5, 2013, now Pat. No. 9,221,618.

(60) Provisional application No. 61/723,074, filed on Nov. 6, 2012.

(51) Int. Cl.
| | |
|---|---|
| *B65G 43/00* | (2006.01) |
| *A21B 3/00* | (2006.01) |
| *B65G 43/02* | (2006.01) |
| *B65G 23/44* | (2006.01) |
| *A21B 1/46* | (2006.01) |

(52) U.S. Cl.
CPC .................. *A21B 3/00* (2013.01); *A21B 1/46* (2013.01); *B65G 23/44* (2013.01); *B65G 43/02* (2013.01)

(58) Field of Classification Search
CPC ......... B65G 23/44; F16H 7/08; F16H 7/0861; F16H 7/0891; F16H 7/0865; F16H 7/087; F16H 7/0812
USPC ...................................................... 198/810.02
See application file for complete search history.

(56) References Cited

U.S. PATENT DOCUMENTS

| | | | |
|---|---|---|---|
| 3,308,768 A | 3/1967 | Orwin | |
| 3,662,873 A | 5/1972 | Ross | |
| 3,963,115 A | 6/1976 | Teske et al. | |
| 4,245,739 A | 1/1981 | Hartley et al. | |
| 4,284,192 A * | 8/1981 | Taylor | B65G 23/44 198/813 |
| 4,294,345 A | 10/1981 | Stauber et al. | |
| 4,422,544 A | 12/1983 | Alldredge | |
| 4,657,131 A * | 4/1987 | Brychta | B65G 23/44 198/810.02 |
| 4,793,473 A | 12/1988 | Gilgore et al. | |
| 4,860,634 A | 8/1989 | Hein | |
| 5,147,033 A | 9/1992 | Kasik | |
| 5,186,280 A | 2/1993 | Mattcheck | |

(Continued)

*Primary Examiner* — William R Harp
(74) *Attorney, Agent, or Firm* — Thomas|Horstemeyer, LLP (57) ABSTRACT

A chain tensioning sprocket is moveable with a predetermined force into a U-shaped path of a chain to apply continuous tensioning force to the chain. The change in length of the chain is measured by detecting the movement of the chain tensioning sprocket into the U-shaped path of the chain, and measurement of movement of the chain tensioning sprocket indicates a change in the length of the whole chain, which, in turn, indicates the wear on the parts of the chain and the expected operative life of the chain.

5 Claims, 6 Drawing Sheets

(56) References Cited

U.S. PATENT DOCUMENTS

| | | | |
|---|---|---|---|
| 5,579,897 A | 12/1996 | Kasik | |
| 5,641,058 A * | 6/1997 | Merten | B65G 23/44 198/810.04 |
| 6,257,397 B1 | 7/2001 | Kilby et al. | |
| 6,591,968 B2 | 7/2003 | Snell et al. | |
| 6,746,352 B1 * | 6/2004 | Poiret | F01L 1/02 474/101 |
| 6,766,898 B2 | 7/2004 | Lessard et al. | |
| 6,851,546 B2 | 2/2005 | Lodge | |
| 6,968,943 B2 | 11/2005 | Kilby et al. | |
| 7,086,525 B2 | 8/2006 | Kilby et al. | |
| 7,117,989 B2 * | 10/2006 | Weigel | B65G 23/44 198/502.1 |
| 7,140,486 B2 | 11/2006 | Kim | |
| 7,540,374 B2 | 6/2009 | Rathbun et al. | |
| 7,798,313 B2 * | 9/2010 | Hesketh | B65G 23/44 198/814 |
| 8,151,977 B2 | 4/2012 | Domenicucci et al. | |
| 8,550,236 B2 * | 10/2013 | Merten | B65G 23/44 198/502.1 |
| 9,132,965 B1 * | 9/2015 | Nicholson | B65G 23/44 |
| 9,221,618 B2 * | 12/2015 | Domenicucci | B65G 43/02 |
| 2011/0220699 A1 * | 9/2011 | Ehrmann | B65B 9/04 226/4 |

* cited by examiner

OVEN CHAIN MEASUREMENT SYSTEM

CROSS REFERENCE TO RELATED APPLICATIONS

This application claims priority with respect to U.S. provisional patent application Ser. No. 61/723,074, filed in the U. S. Patent and Trademark Office on Nov. 6, 2012, and to patent application Ser. No. 14/072,026, filed in the U.S. Patent and Trademark Office on Nov. 5, 2013, now U.S. Pat. No. 9,221,618, issued Dec. 29, 2015.

FIELD OF THE INVENTION

This disclosure concerns an apparatus for monitoring, and managing the maintenance, and safety of industrial ovens, such as bakery ovens including monitoring thermal expansion of the chain, monitoring the length of the chain, and maintaining the tension of the chain, all to extend the safety and life of the chain.

BACKGROUND OF THE INVENTION

The most common type of oven in industrial white bread and bun bakeries is the direct fired oven. The oven can include a traveling tray oven or a tunnel oven. A traveling tray oven has trays loaded with product that are maintained level by three large pitch engineering class roller conveyor chains. The trays travel on the chains toward the back of the oven and go around sprockets to travel down and back toward the front of the oven where the trays are unloaded. The tray oven chains have a bushing every 36" or 42" (depending on the size of the oven) to support the center trunnion (axil) of the tray and a third chain with bushings that supports a "Z" bar that stabilizes the tray to keep product from falling off the tray.

A tunnel oven is a long conveyor that has either grids, plates, or mesh attached to two side chains. The side chains travel parallel to each other down the sides of the oven carrying the product. The tunnel oven chains have an attachment at every link to support a grid, plate or wire. The attachment has a keep plate with a keyed hole to fit over a mushroom pin in the attachment. The keeper plate is riveted.

Each type of oven requires engineering class roller conveyor chains. These are heavy duty chains with oversized rollers that support the grids and product and roll along tracks in the ovens. These chains are not the same as roller chain. Engineering class roller conveyor chain is designed for slow moving applications in extreme environments.

Bakeries usually have redundant systems for mixing, make up, packaging, and loading. Most bakeries do not have redundant ovens, mostly due to size and cost. Therefore if the oven does not work, the bakery cannot produce. The most critical component of the oven is the oven chains. If an oven chain fails the oven cannot produce. Replacement oven chains are extremely expensive and usually have very long lead times. Therefore it is essential that the oven chains are well maintained.

Maintenance usually entails regular lubrication and cleaning. The lifespan of an oven chain typically can be from 5 to 10 years depending on the size of the oven, run time, and quality of maintenance. It is possible to have oven chains running for upward of 30 years or more. Conversely, if a chain is poorly maintained the life span can be reduced to 1 to 2 years.

Up until now, oven chains were lubricated based on the bakery production schedule. Chains are usually lubricated once per week on the down day, never knowing if the chain needed to be lubricated every 5 days or every 14 days. Knowing exactly when the chains actually need to be lubricated can significantly extend the life of the chain and reduce the lubrication costs.

When a bakery changes an oven chain, usually the task gets so difficult the project runs the risk of complete failure. Since the replacement costs are so high, $50K to 125K, the plant usually will try to put off replacement for as long as possible.

Typically the bakery has to engage an outside service to conduct the chain replacement. Depending on how bad the chain has worn sometimes the contractor will remove about thirty feet of chain from both sides of the oven and measure their lengths. The measurements are compared to a new length of chain based on the number of links. From that measurement, it is possible to determine the total amount of wear on each chain.

The chain management system disclosed herein will determine and notify the baker when the oven chain needs lubrication. In addition the chain management system disclosed herein will track the length of the chain every time the oven is started and compare it to the chain length when the oven was new. So when the time comes the baker will know how much the chain has worn and plan for the replacement.

There are three key components to the chain management system disclosed herein:
1. Power monitoring to determine when the chain needs to be lubricated and determine the load on the chains.
2. Chain tension monitoring to determine the correct tension and determine when the chain has too much load.
3. Chain length monitoring to determine the amount of wear and if the chain is not running parallel.

Power Monitoring:

Power monitoring is accomplished through the VFD (variable frequency drive) that the oven operators use to control the speed (baking time) of the oven. The operators of the oven will know from experience what the typical loads should be. We also know from experience that once the lubrication begins to degrade the power used to operate the oven starts to increase over time. In the system disclosed herein we can set three set points for the oven power:

Lubrication, when the power reaches a preset wattage an alarm will be set off, indicating that it is time to lubricate.

High Load Warning: When the power reaches a preset wattage an alarm will signal that the drive seeing too much load and something must be wrong.

High Load Alarm: When the power reaches a preset wattage an alarm will signal and stop the oven to prevent a catastrophic chain, grid, tray and pan jam and damage to the oven.

We chose to monitor power instead of amperage for this system because power is linear and has equal sensitivity at both low and high loads, where amperage has no sensitivity for low loads.

Chain Tension Monitoring:

In the past oven chains were kept under tension by the use of large springs. As the springs compress, the amount of tension increases. In addition it is well known that springs fatigue over time and need to be frequently adjusted or replaced. Our chain tension monitor uses hydraulic pressure to maintain a continuous preset amount of pressure to both take up sprockets.

Our engineered class conveyor chain is designed to operate at very high temperatures. The design temperature parameters are 70° F. to 500° F. The linear expansion of this chain is 0.00000633" (0.000160782 mm) per inch of chain per degree F. Therefore a typical moderate length oven of 152 feet (requires 164 feet of chain per side) will thermally expand 5.370 inches (136.39 mm) from cold to operating temperature. This expansion does not occur all at one time. In the 164 feet of chain expands at 0.01242 inches (0.315 mm) per degree F. At this amount of movement the only way to accurately maintain even continuous tension on the chain is to monitor the hydraulic pressure used to tension the chain.

The chain expands at a minute rate. To maintain the chain tension, we use an air over hydraulic pump. This type of pump operates at 625 psi (43 bar) and can displace 0.83 $in^3$ (13.6 ml) of hydraulic oil per cycle. This minute amount of oil enables the system to maintain precise control over the tension.

Chain Length Monitoring:

A cable actuated position sensor is fastened to the frame of the oven and the sensor wire is attached to the chain take up. The sensor is an incremental encoder with a resolution of 0.025 mm. At this resolution the sensor will signal 12.6 times per F.° of thermal expansion (based on 164' of chain mentioned above that will thermally expand 0.01242" (0.315 mm per F°). This is extremely precise. This date goes directly through the PLC to the operator interface to indicate the exact position of the take up, i.e. the length of chain.

Examples of some prior art oven chains are illustrated and described in U.S. Pat. Nos. 4,294,345; 4,657,131; 5,147,033; and 7,086,525.

SUMMARY OF THE INVENTION

Briefly described, this invention disclosure concern a chain management system for a continuous conveyor chain, such as a roller chain that moves continuously to carry work products through a processing path, such as bread through an open ended hot baking oven.

The process and apparatus described herein may be used for determining the wear of a continuous roller chain of the type that moves products such as uncooked bread products through a heated tunnel oven, or other paths of movement. This may be accomplished without having to remove the chain from the chain drive system and without having to cool the oven or remove the chain from the oven.

More particularly, the process may include the steps of detecting the deterioration of a continuous conveyor link chain extending through an open ended bakery oven, even as the chain moves along its length through the oven while the oven is in operation. Usually, the deterioration of the chain is due to wear of the links of the chain, and as the links of the chain deteriorate the length of the chain increases.

The chain measuring process may include applying constant predetermined tension to the chain at different times and measuring the increase in length of the chain. The measurements may be made as the chain moves through the heated oven. Usually, the chain may be measured at different time intervals as the chain moves along its length under constant tension through the hot open-ended oven. The measurements at different time intervals are compared to determine the rate of increasing length of the chain, and therefore the rate of deterioration of the chain and the remaining life of the chain.

Constant and predetermined tension force may be applied to the moving chain during the measurements of the chain. The chain extends in a U-shaped path about a chain tensioning sprocket, and a tensioning force is applied by moving the chain tensioning sprocket into the U-shaped path of the chain. This tends to increase the depth of the U-shaped path as the length of the chain increases due to wear and other conditions of the chain. A detector, such as a resistance transducer and wire, ultrasonic distance sensor or linear position sensor, may be applied to the chain tensioning sprocket to determine the position of the sprocket. As the chain wears and increases in length, the chain tensioning sprocket moves toward the depth of the U-shaped path to maintain the constant tension in the chain. A measurement of the change of position of the guide sprocket or the depth of the U-shaped path indicates the increased length of the entire chain.

In order to avoid measuring the expansion of the conveyor chain due to changes of chain temperature, the chain should be measured at the same temperature for each measurement, or a calculation of the temperature expansion of the chain should be made. Therefore, the process of measuring the chain may include recording the temperature of the chain when the chain is being measured. With this information, an estimate is made concerning the remaining useful life of the measured chain.

Another feature of this disclosure is the chain management system may include a chain tensioning system to minimize the variable chain tension produced by prior art spring take ups. A typical spring take up that is applied to a chain tensioning sprocket will tend to expand or contract due to changes in temperature of the chain and due to the temperature of the spring. Typically, the oven is cooler and without any product loading when the roller chain is about to be lubricated. But as the chain cools the chain shrinks and applies more force against the coil spring, causing increased tension in the spring and in the roller chain. This is not optimal for applying good lubrication to the roller chain.

This disclosure includes a fluid actuated chain tensioning system that applies constant force to the chain tensioning sprocket during the normal operation of the baking oven. When the oven operation is terminated the fluid activated tensioning system may be deactivated to relieve the force applied to the chain tensioning sprocket. This allows the chain to relax for lubrication and inspection.

This disclosure includes a process for detecting the deterioration of a continuous conveyor link chain extending through a continuous path due to wear of the links of the chain, by moving the chain along its length through the continuous path, extending the chain about a rotary chain tensioning device, moving the rotary chain tensioning device to apply constant tension in the chain, repeatedly measuring the movement of the rotary chain tensioning device at different times when constant tension is applied to the chain by the rotary chain tensioning device and as the chain moves along its length, comparing the measurements of the movement of the rotary chain tensioning device, and determining the remaining operational life of the chain based on the distance of linear movement of the chain tensioning device at different times.

Other objects, features and advantages of this disclosure will become apparent upon reading the following specification and claims and reviewing the accompanying drawings.

DETAILED DESCRIPTION

Figure 1A:
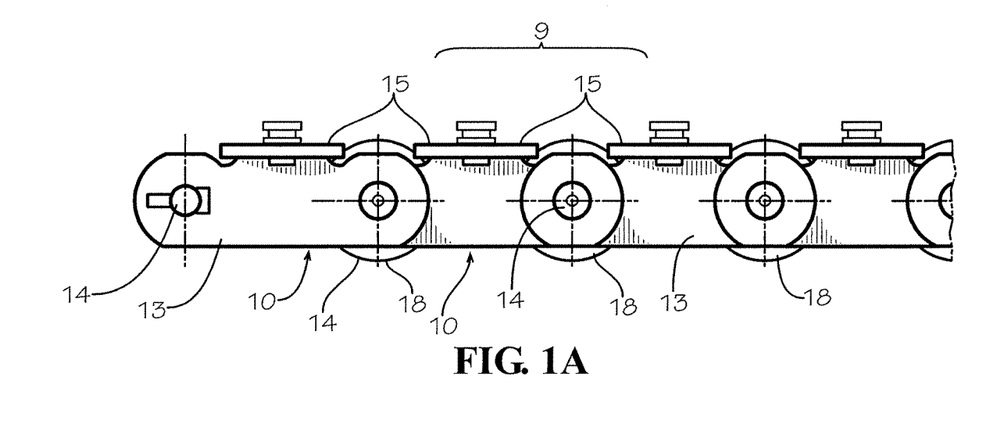
FIG. 1A is a side elevational view of a segment of an oven roller chain.
Figure 1B:
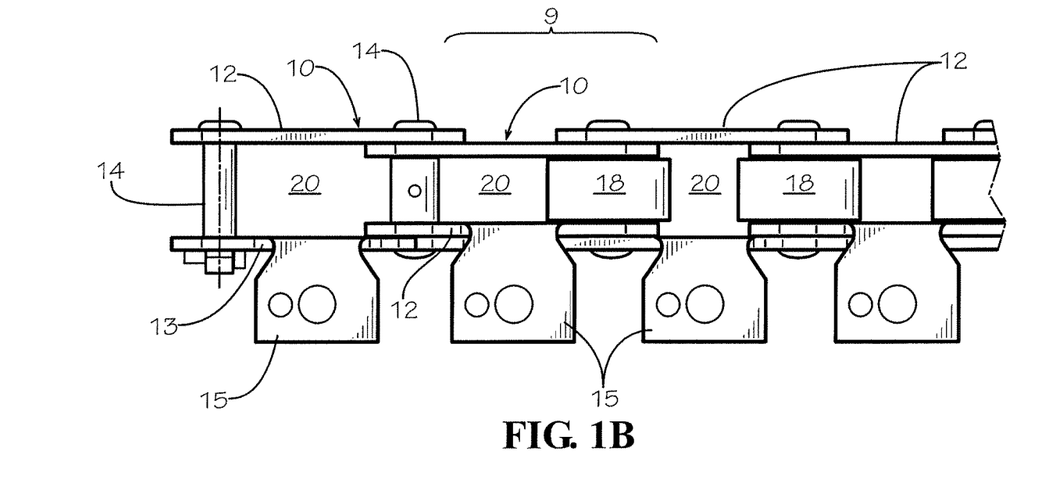
FIG. 1B is a top view of the segment of the roller chain of FIG. 1A, showing a connector pin and a bearing sleeve in the left two links, and the assembled rollers in the right two links.
Figure 2A:
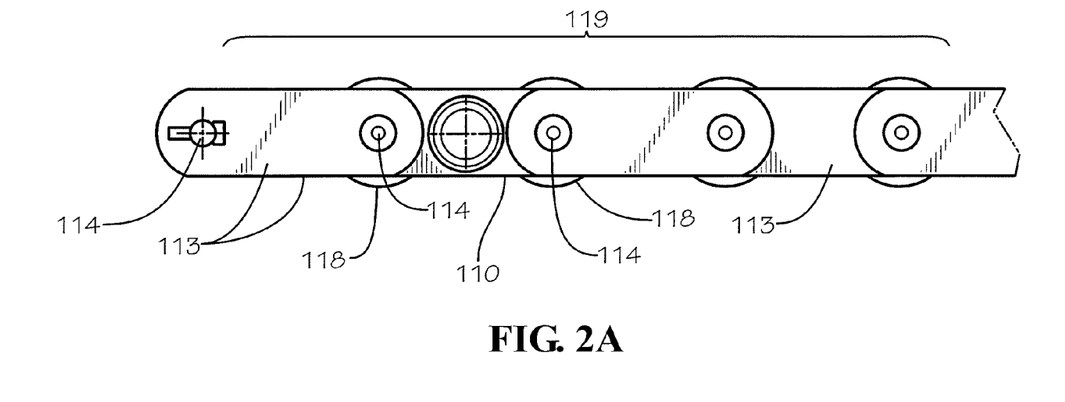
FIG. 2A is a side elevational view of a segment of another type of oven roller chain.
Figure 2B:
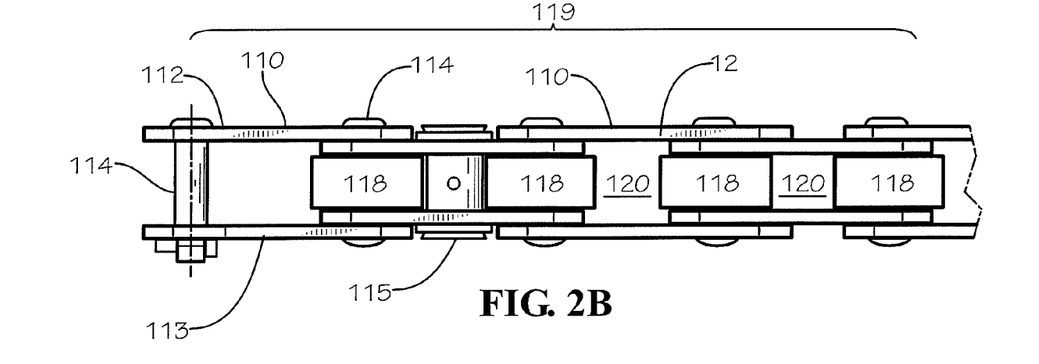
FIG. 2B is a top view of the segment of a roller chain of FIG. 2A.
Figure 3A:
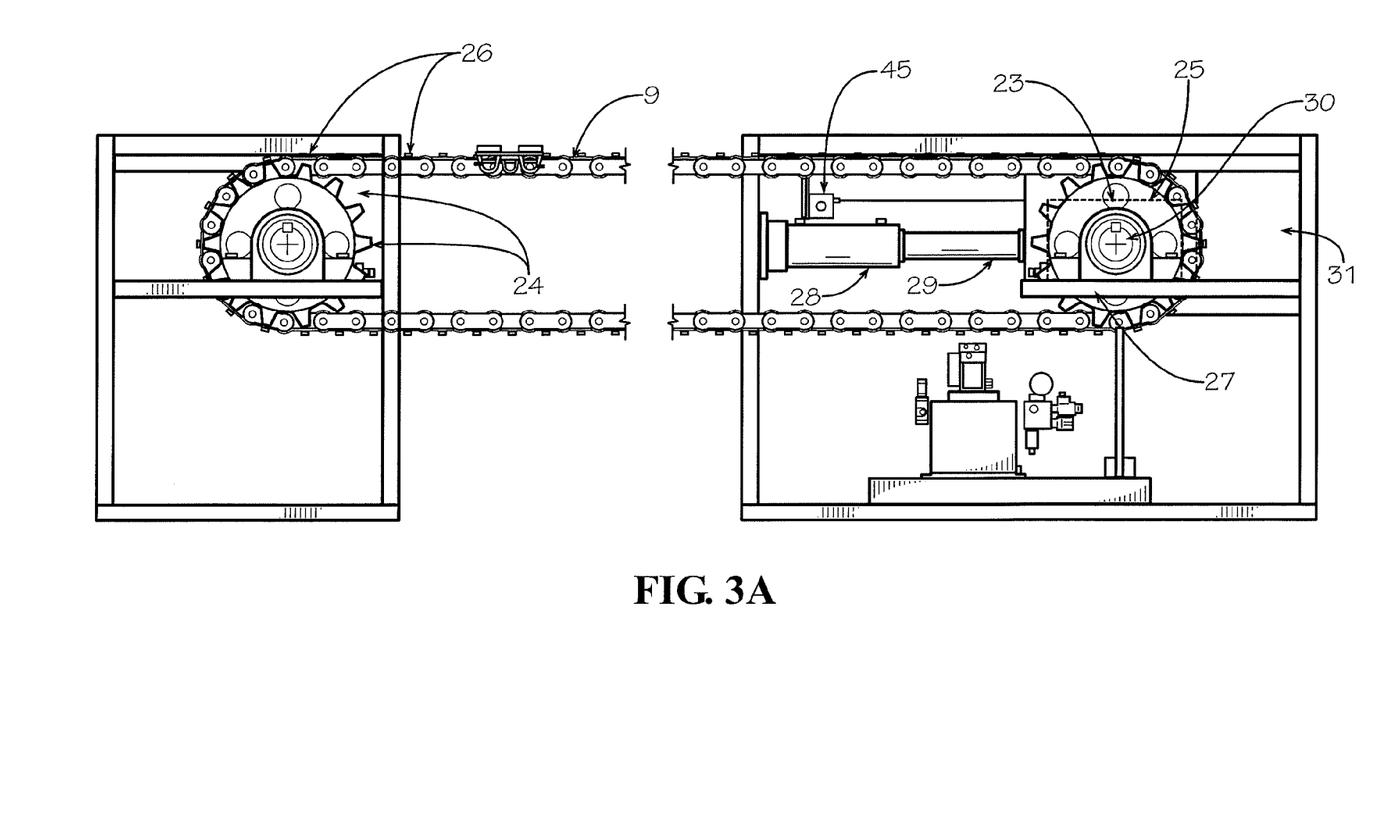
FIG. 3A is a side view of a chain tensioning sprocket, a driving sprocket, and a portion of the oven roller chain extending in a U-shape about the chain tensioning sprocket, with the cylinder and its piston that apply the force to the chain tensioning sprocket.

Referring in more detail to the drawings, in which like numerals indicate like parts throughout the several views, FIGS. 1A and 1B illustrate a segment of an endless roller chain 9 of the type that may be used in a tunnel of a baker's oven. FIGS. 2A and 2B illustrate a segment of another endless roller chain 119 also of the type that may be used in the same environment. Other types of chains may be used. As shown in FIG. 3A, the roller chain, such as chain 9, extends about a driving sprocket 8 and about a tensioning sprocket 23 and about other sprockets (not shown) that support and guide the chain.

As shown in FIGS. 1A and 1B an embodiment of a roller chain 9 has links 10 and each link may include a pair of parallel side plates 12, 13 that have end portions that overlap the side plates of the next adjacent chain links, and connector pins 14 that are mounted through the overlapping ends of the pairs of side plates. Rollers 18 are mounted on the connector pins 14 between the parallel side plates 12 and 13. Spaces 20 are located between and on opposite sides of each roller 18, between the side plates 12 and 13.

Figure 3B:
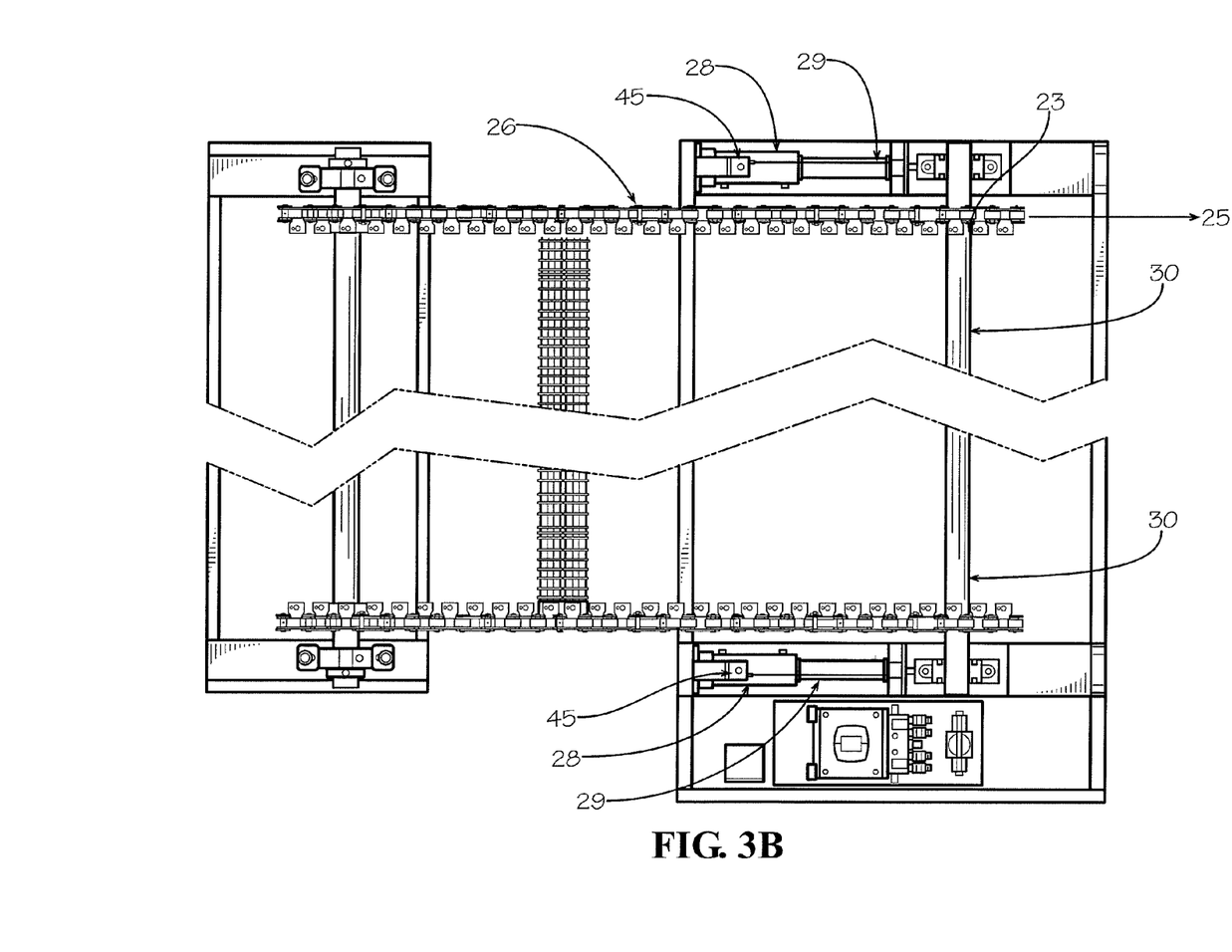
FIG. 3B is a top view of the chain tensioning socket and the cylinders that apply linear force to the chain tensioning socket.

The teeth 24 of the sprockets 8 and 23 (FIG. 3) fit into the spaces 20 on opposite sides of the rollers 18 and their connector pins 14 for advancing and guiding the roller chain through the passage of a tunnel oven, as is conventional in the art.

The side plates 13 on one side of the roller chain 9 each may include a mounting flange 15 (FIG. 2) that extends at a right angle from the side plate, horizontally to one side of the direction of travel of the roller chain, and baking pans 26 (FIG. 3A) may be mounted to the mounting flanges 15 for carrying the work products along the chain and through the oven.

FIGS. 2A and 2B illustrate another type of roller chain that may be used for baking ovens. As with the chains illustrated in FIGS. 1A and 1B, the chain links 110 of the roller chain 119 of FIGS. 2A and 2B each include a pair of parallel side plates 112, 113 that have end portions that overlap the side plates of the next adjacent chain links, and connector pins 114 that are mounted through the overlapping ends of the pairs of side plates. Rollers 118 are mounted on the connector pins 114 between the parallel side plates 112 and 113. Spaces 120 are located between and on opposite sides of each roller 118, between the side plates 112 and 113. A pan connector 115 is mounted to the links 112 and 113.

Other types of continuous chains and baking pans may be used with this invention.

FIG. 3A illustrates the chain tensioning device 22 that includes chain tensioning sprocket 23 of a conventional roller chain, with the roller chain 9 or 119 extending through the chain passage of a baker's tunnel oven (not shown). Both sprockets have a plurality of circumferentially spaced teeth 24 that extend radially outwardly from the perimeter of the sprocket and are sized and shaped and positioned to fit into the spaces 20 or 120 of the chain links 10 and 110, on opposite sides of rollers 18, 118. The drive sprocket 8 that may be similar in design to the chain tensioning sprocket 22 moves the continuous chain through the oven and about the chain tensioning sprocket 23 as indicated by the direction arrows 25 and 31 of FIG. 3A.

As shown in FIG. 3B, the chain tensioning device 22 may include a pair of fluid activated cylinders 28, each with a piston 29 extending on opposite sides of the chain tensioning sprocket 23. In response to the pressure applied by the cylinders 28 to pistons 29, the pistons 29 urge the chain tensioning sprocket 23 toward the inside of a U-shaped path 31 formed by the roller chain about the tensioning sprocket 23 as the roller chain passes about the tensioning sprocket. This applies linear force 27 to the chain tensioning sprocket that, in turn, pushes the chain tensioning sprocket 23 toward the inside of the U-shaped path 31 of the roller chain and tends to apply tension to the entire length of the roller chain, including the span of the continuous chain that extends entirely through the oven (not shown). The chain tensioning sprocket 23 is free to rotate about its own axis 30 in response to the movement of the roller chain by other driven sprockets 8. The linear movement 27 of the chain tensioning sprocket into the U-shape of the roller chain indicates the expansion of the entire length of the roller chain, and measurement of the linear movement of the chain tensioning sprocket and comparison of the linear movement with linear movements previously taken indicates the amount of expansion of the chain between measurements.

The control system for the fluid actuated cylinders 28 should be capable of applying a constant fluid pressure to the cylinders to apply a constant predetermined force to the chain tensioning sprocket 23. Various fluid circuits may be used.

Figure 4:
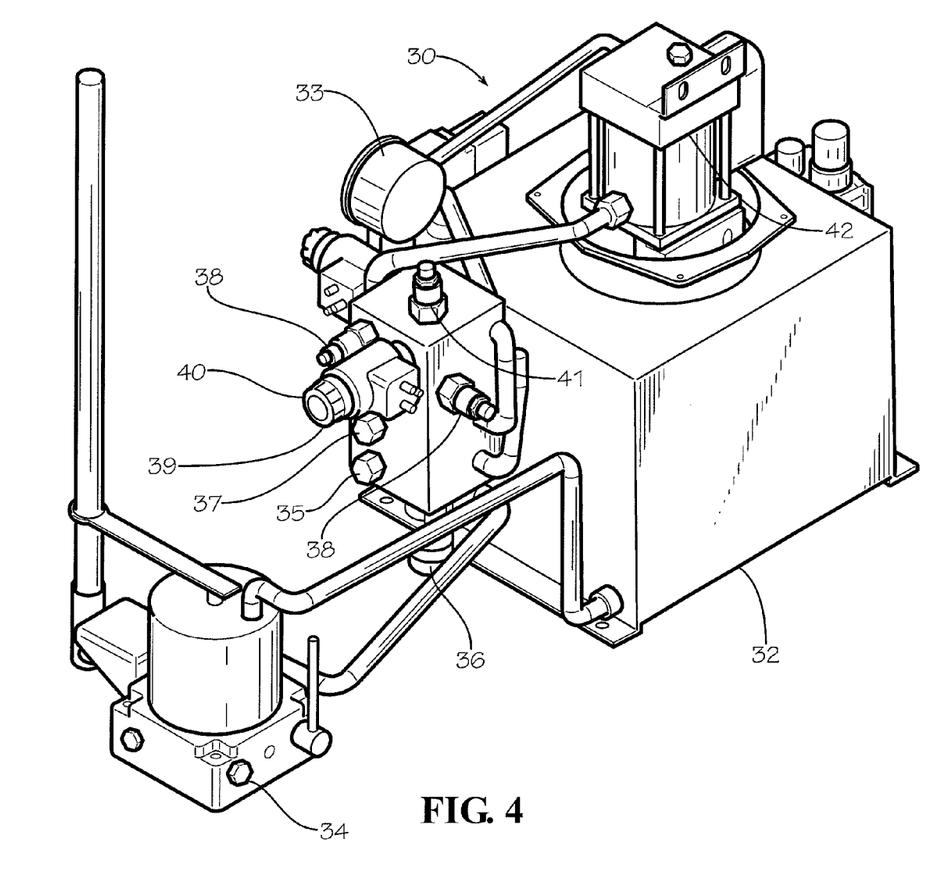
FIG. 4 is a perspective view of the hydraulic unit that includes the air over liquid pump and the hydraulic fluid tank for charging the hydraulic cylinders of FIGS. 3A and 3B.

For example, FIG. 4 shows the control system for the fluid actuated cylinders 28. The control system 30 includes tank 32 for supplying hydraulic fluid that is to be provided under pressure to the cylinders 28 of FIGS. 3A and 3B, cage 33, manual pump 34, check valve 35, needle valve 36, plug 37, and needle valve 38. The two-way direct acting solenoid valve 39 is mounted adjacent the needle valve structure 38. Two-way solenoid valve 40 is mounted to the attachment box that is, in turn, mounted to the tank 32. Haskel pump 42, that is a gas over liquid pump, is mounted atop the tank 32 and communicates with the conduit extending from the valve 43.

Figure 5:
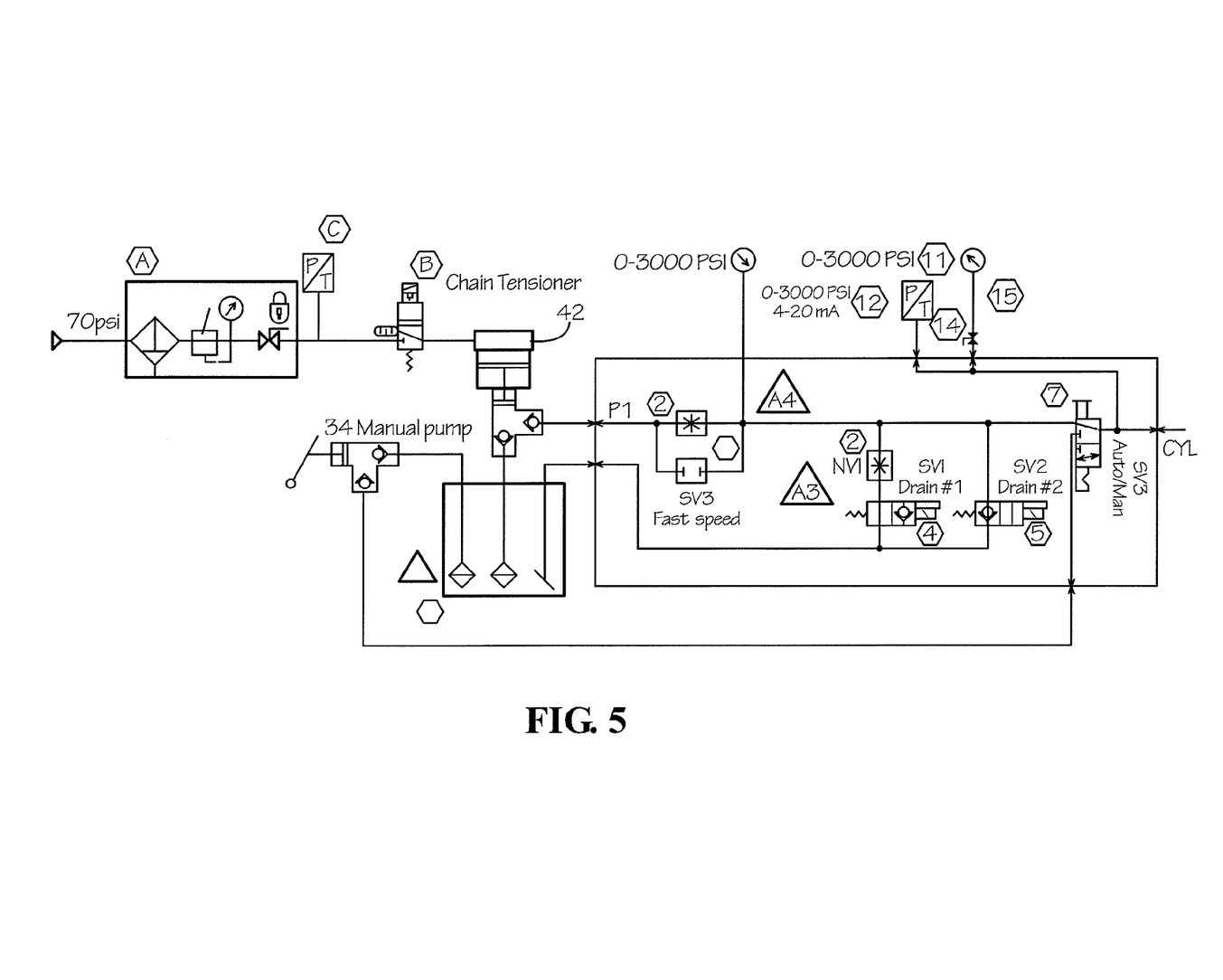
FIG. 5 schematic view of the control circuit that controls the force applied to the chain tensioning sprocket.

As shown in FIG. 5, the electrical/hydraulic circuit communicates with the cylinders/pistons 28 and 29 of the chain tensioning sprocket 23 (FIG. 3). The hydraulic system includes a pneumatic filter A, a poppet valve B, and an effector C. The filter A is a combination of filter, regulator, and shut-off valve. Effector C is a pressure transducer, and two-way poppet valve B supplies air pressure when the pump is to be activated and air pressure is applied to the Haskel pump 42. When the system is to be shut down, the system will go back to zero mechanical energy and the valve B will just vent to the atmosphere so that there is no air pressure on the system.

The Haskel pump 42 communicates with a needle valve 52. When the needle valve 52 opens, the oil will flow down to either position 3, position 4, position 5, or position 7. When pumping up the hydraulic oil, at position 51, the pump has a line that goes down the tank and sucks oil from the tank.

There is a line coming from the pump down to the tank. Another line from the tank extends into the manual pump 10. With regard to the pneumatic pump, there is a call for pressure. On the air side B there is an air valve that will let air flow through to the pump. The pump is a positive displacement device so as the pump sucks up oil and pushes it along, it now has a vacuum so more air will go in and move the cylinders to bring up more oil. Oil will travel out at P1 of the valve body. The oil moves inside the big aluminum valve. The oil moves through a needle valve 2 and the pressure of the oil may be measured by gauges 114, 115 and 111. That prevents high pressure jolts of oil from moving that valve too much and moving the cylinder too much to avoid breaking the pressure gauge by exposing it with hard blasts of pressure.

The arrangement dampens the pressure so that high spikes of oil pressure are avoided. This prevents the gauge from being damaged. Ball valve 119 charges the pressure gauge. When the ball valve is closed, the snubber is removed and the pressure gauge can be relieved if the chain is to be serviced. The oil travels down to another needle valve 2, then goes down to needle valve 4 which is a two-way solenoid. At that point the oil moves out to 5 or the oil is returned to the tank. The oil flow is controlled so that it can go in either direction.

A bleeder valve may be opened to bypass oil back to the tank. A two-way manually operated valve may be positioned in the down position if there is a failure in the pump. If there is a failure of the pump, the operator may move a valve to activate the manual pump.

The pressure that's going out to the cylinders is measured and may be adjusted. With this arrangement the pressure of the gas may be changed.

For example, if the oven is cold and if the desired hydraulic pressure to be communicated to the cylinders 28 is 1000 psi, the pressure in the cylinders is increased until the pressure in the cylinders is 1000 psi and the system is ready to be heated for baking operations with the oven "running." But as the oven heats up, the roller chain will expand due to its thermal expansion. The roller chain will reduce the pressure against the two cylinders because the chain is getting longer due to thermal expansion. But the pressure transducer measures the pressure and it sends a signal back to the PLC that says "run the pump." The pump gets the hydraulic pressure back to 1000 pounds and stops again. This may happen fifteen times in the first hour. It may happen ten times in the second hour and five times in the third hour, depending on conditions such as changing temperature of the roller chain, oven and tensioning sprocket 23, etc.

Once the oven is fully expanded due to the application of heat, the number of corrections of force applied by the chain tensioning sprocket is reduced. It usually takes 2 or 3 hours to stabilize the temperature of the roller chain. Once the temperature of the roller chain is substantially stabilized, there might be another correction signal for changing the force of the cylinders through the course of the day. An object of the process is to maintain a constant pressure against hydraulic cylinders so that the tension applied to the oven chain is constant. That results in tension being applied against the chain at all times during the operation of the oven.

Another advantage of the system is when the system disclosed herein is to be shut down at the end of the day, solenoid valves are opened and bleed the oil back to the tank and reduce the pressure in the hydraulic cylinders down toward zero. This relieves the forces on the chain tensioning sprocket 23 and on the continuous roller chain 9, so that the chain can be more easily inspected and lubricated, etc. Also, as the chain usually is allowed to cool overnight when the oven is not in operation, and the chain does not have to cool under tension.

While the chain management system described above has been described in connection of a baker's tunnel oven, it may be used in connection with intermediate proofers, final proofers, racetrack coolers, spiral coolers, in-ground basket transport systems and possibly in many other types of chain applications. The disclosed chain management system allows plant engineers to predict when the chain needs to be replaced instead of waiting for failure. The system also allows the engineers to predict when the chain should be lubricated.

The chain management system may monitor the expansion of the chain from the first operation of the oven. It can be programmed to measure the roller chain of a baker's oven chain every time the oven is started hot or cold and maintain the measurement in the memory of a PLC. At the end of any period, such as the end of a calendar quarter, there can be an output available from previous chain measurements to inform the plant engineers of how much expansion of the chain has occurred between measurements and how much the chain has worn during that period. And, based on the differences of the measured lengths of expansion of the entire length of the chain, an accurate estimate of remaining chain life may be obtained by comparison with previously established histories of the performances of other similar roller chains.

The chain management systems may use various measuring devices to measure the length of a chain, such as by attaching a laser, IR beam, resistance wire, or ultrasonic measuring device to a fixed position near the chain tensioning sprocket on the frame of the oven. The chain measuring device is focused on the movable chain tensioning sprocket. Each time the oven starts, the position of the chain tensioning sprocket may be recorded and compared to its previous position. This distance may be measured in time increments such as every 5, 30, 60, 300, or 750 seconds and the measurements may be stored in the memory of a PLC. The PLC translates this measurement into inches or millimeters along with the temperature of the chain and displays an output on an operator interface. The PLC can track this measurement until the oven is turned off, and it may continue to track it until the oven has cooled. The operator interface output is in the form of a graph (line, bar, column) and shows the changes in the length of the chain due to temperature and wear. The plant engineer can decide to let the data remain in the PLC or download it into the plant SCADA system.

The chain management system also incorporates a device, such as an inverter, transducer and other metering devices to measure the work of the chain. The PLC will track the work and output of the work in the form of a graph such as a line, bar, or column graph. By tracking the work precise data can be maintained on the load of different products and pans in the oven. In the event of an indication of a high change in work load, the PLC may be programmed to signal an alarm and prevent a catastrophic oven breakdown. Further, in a tray oven the trays may be marked with sequence numbers and the number of the tray that is at the front of the oven will be recorded at the alarm.

The chain management system can be supplied with all new oven tray, grid, plate, mesh belt, intermediate tray proofers, final proofers including rack, tray, and conveyorized stabilized tray, and coolers such as rack, spiral, race track, and continuous coolers, and in-ground basket transport systems. The chain management system also can be retrofitted into existing machines mentioned above.

The chain management system not only can be used for ovens, but may be used for other devices such as, but not limited to, intermediate proofers, final proofers, racetrack coolers, spiral coolers, and in-ground basket transport systems. The chain management system will allow the engineers to predict when the chain needs to be replaced instead of after failure. It will also allow the engineers to predict when the chain should be lubricated.

While this disclosure describes a system of measuring the change of length of a continuous roller chain, the system may be applied to other continuous items that have tension applied thereto, including other types of continuous link chains.

Although a preferred embodiment of the invention has been disclosed in detail herein, it will be obvious to those skilled in the art that variations and modifications of the disclosed embodiment can be made without departing from the spirit and scope of the invention as set forth in the following claims.

The invention claimed is:

1. Apparatus for detecting the deterioration of a continuous conveyor link chain extending through a tunnel oven due to wear of the links of the chain, comprising:
    a tunnel oven,
    a rotary drive sprocket for moving the chain along its length through the tunnel oven,
    a rotary chain tensioning sprocket for guiding the chain in a U-shaped path about the tensioning sprocket
    a chain tensioning device for applying force to the rotary chain tensioning sprocket and moving the rotary chain tensioning sprocket into the U-shaped path of the chain to apply tension in the chain,
    a chain measuring device for repeatedly measuring the distance of the movement of the rotary chain tensioning sprocket into the U-shaped path as the chain moves along its length and when tension is applied to the chain by the chain tensioning sprocket, and
    means for comparing the measurements of the movements of the rotary chain tensioning device and for estimating the remaining operational life of the chain based on the distance of linear movement of the chain tensioning device at different times.

2. The apparatus of claim 1, wherein the tunnel oven is a baker's industrial oven, and the continuous conveyor link chain comprises a roller chain.

3. The chain measuring device of claim 1, wherein said detection means is selected from a group consisting of: an optical scanner, a resistance transducer and wire, ultrasonic distance sensor, and a linear position sensor.

4. A tunnel oven comprising a continuous conveyor chain extending through the tunnel oven, a chain measuring apparatus for measuring the change of length over time of the continuous chain extending through the heated tunnel oven and without interrupting the movement of the chain,
    a chain tensioning sprocket in engagement with said chain for guiding the continuous chain along a continuous path through the oven and through a U-shaped path outside the oven,
    sprocket moving means configured for urging said chain tensioning sprocket linearly in an intersecting direction toward the U-shaped path of the continuous chain to guide the continuous chain in the U-shaped path about said chain tensioning sprocket and to apply tension in the whole continuous chain, and
    detection means positioned to detect the linear movement of the chain tensioning sprocket toward the U-shaped path over time and to determine the amount of expansion of the length of the chain.

5. The chain measuring apparatus of claim 4, wherein said sprocket moving means is moveable with a predetermined force into the U-shaped path of the chain to apply continuous tensioning force to the chain, such that the length of the chain is measured by detecting the movement of the chain tensioning sprocket into the U-shaped path of the chain and measurement of movement of the chain tensioning sprocket indicates a change in the length of the whole chain, which, in turn, indicates the wear on the parts of the chain and the expected operative life of the chain.

* * * * *